United States Patent
Zamyatin et al.

(10) Patent No.: US 8,712,134 B2
(45) Date of Patent: Apr. 29, 2014

(54) METHOD AND SYSTEM FOR EXPANDING AXIAL COVERAGE IN ITERATIVE RECONSTRUCTION IN COMPUTER TOMOGRAPHY (CT)

(75) Inventors: Alexander Zamyatin, Hawthorn Woods, IL (US); Daxin Shi, Vernon Hills, IL (US); Mihail Petru Dinu, Mundelein, IL (US)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 46 days.

(21) Appl. No.: 13/275,679

(22) Filed: Oct. 18, 2011

(65) Prior Publication Data

US 2013/0094735 A1    Apr. 18, 2013

(51) Int. Cl.
*G06K 9/00*    (2006.01)
*A61B 6/00*    (2006.01)
*A61B 5/05*    (2006.01)

(52) U.S. Cl.
USPC .................. 382/131; 378/4; 378/21; 600/425

(58) Field of Classification Search
USPC ......... 382/128, 129, 130, 131, 132, 133, 134; 378/4, 8, 21–27, 101; 600/407, 410, 600/411, 425, 427; 128/920, 922
See application file for complete search history.

(56) References Cited

U.S. PATENT DOCUMENTS

| | | | |
|---|---|---|---|
| 6,307,909 B1 * | 10/2001 | Flohr et al. ................. | 378/4 |
| 7,379,525 B2 * | 5/2008 | Basu et al. .................. | 378/4 |
| 7,505,550 B2 * | 3/2009 | Goto et al. .................. | 378/4 |
| 7,747,305 B2 * | 6/2010 | Dean et al. ................ | 600/407 |
| 2011/0103662 A1 | 5/2011 | Chiang et al. | |

* cited by examiner

*Primary Examiner* — Abolfazl Tabatabai
(74) *Attorney, Agent, or Firm* — Yoshida & Associates, LLC (57) ABSTRACT

The image generation method and system generates an image using a predetermined iterative reconstruction technique from cone beam data that has been expanded by adding additional data, and an instance of the iteration process is weighted according to a corresponding validation weight during the reconstruction. Optionally, an instance of the iteration process is weighted according to a combination of weights during the reconstruction. The predetermined combination of the weights includes axial weights based upon a validity value of the expanded data and statistical weights.

20 Claims, 7 Drawing Sheets

METHOD AND SYSTEM FOR EXPANDING AXIAL COVERAGE IN ITERATIVE RECONSTRUCTION IN COMPUTER TOMOGRAPHY (CT)

FIELD OF THE INVENTION

The current invention is generally related to an image processing and system, and more particularly related to the application of certain weights to a predetermined iterative reconstruction technique after the originally measured cone beam data has been expanded for substantially increasing the Z axial coverage.

BACKGROUND OF THE INVENTION

Figure 1:
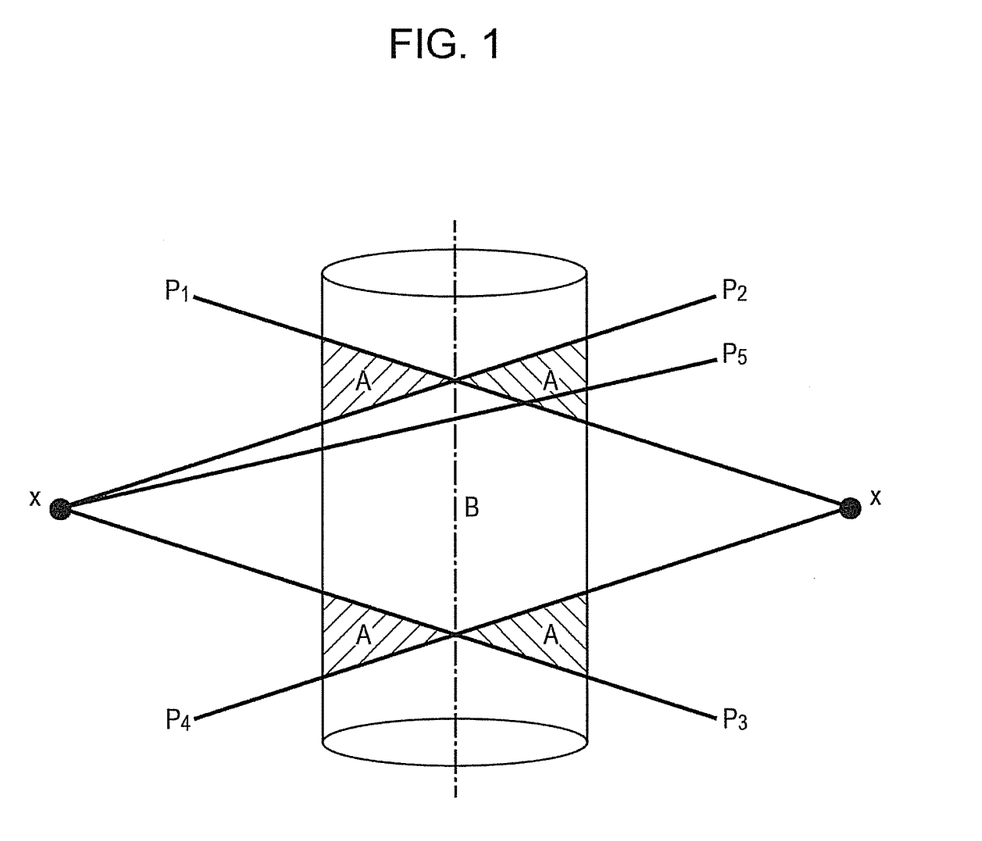
FIG. 1 is a diagram illustrating certain aspects of the prior art problem for causing axial artifacts using circular cone beam data in a multi-slice X-ray CT apparatus or scanner.

It is a well-known challenge in prior art to reconstruct an image of a long object along the z direction from circular cone beam data using an iterative reconstruction (IR) technique. The challenges involve the reduction in axial artifacts that IR suffers due to truncated measured data. For example, if an object to be imaged is confined within a support cylinder as shown in FIG. 1, projection data is acquired by use of the conventional circular cone-beam scanning geometry. The image volumes irradiated by x-rays are defined by the rays $p_1$, $p_2$, $p_3$, and $p_4$ as a source S is rotated around a predetermined vertical axis Z. In this regard, shaded regions A are not sufficiently irradiated in the full-scan scheme since not all rays pass through the regions A within the angular range from 0 to $2\pi$. Generally, iterative reconstruction algorithms fail to accurately reconstruct the region A due to the above described insufficiently measured data.

Furthermore, the iterative nature of IR contributes to the axial artifacts. Since IR uses reprojection, the axial coverage of the reconstruction field of view reduces after each instance of iteration. Still referring to FIG. 1, ray $p_5$ is used to reconstruct a hexagonal region B by direct application of a predetermined iterative reconstruction algorithm. Unfortunately, because the ray $p_5$ passes through both regions B and A, certain inaccuracy in the region A propagates into the region B through the use of the ray $p_5$ through instances of the iteration process. Consequently, the reconstructed values are inaccurate in the region B.

For the above reasons, there remain need and desire for a method and system for substantially reducing axial artifacts in an image that has been reconstructed from cone beam data using an iterative reconstruction algorithm. For volume image reconstruction, an iterative algorithm includes a total variation (TV) minimization iterative reconstruction algorithm. Iterative reconstruction additionally involves Algebraic Reconstruction Technique (ART), Simultaneous Algebraic Reconstruction Technique (SART) or Ordered-subset Simultaneous Algebraic Reconstruction Technique (OS-SART).

DETAILED DESCRIPTION OF THE PREFERRED EMBODIMENT(S)

Figure 2:
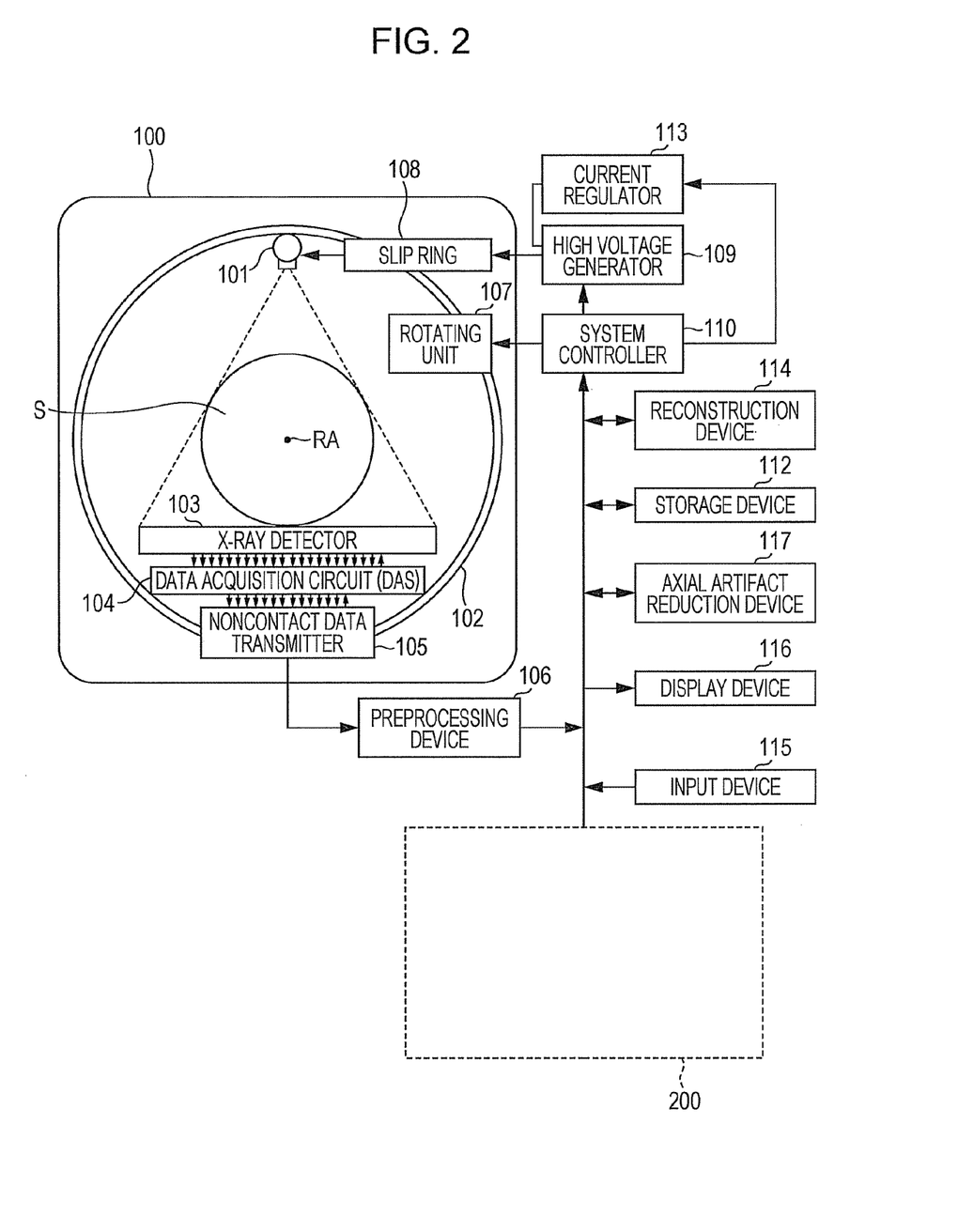
FIG. 2 is a diagram illustrating certain components in one embodiment of the multi-slice X-ray CT apparatus or scanner for substantially reducing the axial artifacts according to the current invention.

Referring now to the drawings, wherein like reference numerals designate corresponding structures throughout the views, and referring in particular to FIG. 2, a diagram illustrates one embodiment of the multi-slice X-ray CT apparatus or scanner according to the current invention including a gantry 100 and other devices or units. The gantry 100 is illustrated from a side view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which is rotatably supported around a rotation axis RA. A rotating unit 107 rotates the frame 102 at a high speed such as 0.4 sec/rotation while the subject S is being moved along the axis RA into or out of the illustrated page.

The multi-slice X-ray CT apparatus further includes a high voltage generator 109 that applies a tube voltage to the X-ray tube 101 through a slip ring 108 so that the X-ray tube 101 generates X ray. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

In the embodiment of the current invention, the X rays are emitted from the X-ray tube 101 with a predetermined cone beam angle and a predetermined fan beam angle. During the data acquisition, the source 101 travels over a predetermined circular trajectory in one embodiment to acquire circular cone beam data according to the current invention. In another embodiment, the source 101 travels over a predetermined helical trajectory to acquire helical cone beam data according to the current invention.

Still referring to FIG. 2, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

One embodiment of the reconstruction device 114 further includes various software and hardware components. According to one aspect of the current invention, the reconstruction device 114 of the CT apparatus advantageously minimizes total variation (TV) using an iterative reconstruction technique. In general, the reconstruction device 114 in one embodiment of the current invention operates the total variation iterative reconstruction (TVIR) algorithm, which performs on the projection data an ordered subset simultaneous algebraic reconstruction technique (OS-SART) step and a TV minimization step. The two steps are sequentially implemented in the main loop where a number of iterations were prescribed.

Before the TV minimization step, the projection data undergoes an ordered subsets simultaneous algebraic reconstruction technique (OS-SART). The projection data is grouped into a predetermined number of subsets N each having a certain number of views. During the ordered subsets simultaneous algebraic reconstruction technique (OS-SART), each subset may be sequentially processed in one embodiment. In another embodiment, a plurality of the subsets may be processed in parallel by taking advantage of certain microprocessor such as multiple central processing units (CPU) or a graphics processing unit (GPU).

During the ordered subsets simultaneous algebraic reconstruction technique (OS-SART), the reconstruction device 114 also performs two major operations. Namely, for each subset N, the reconstruction device 114 re-projects the image volume to form the computed projection data and back-projects the normalized difference between the measured projection and the computed projection data to reconstruct an updated image volume. In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset, and this is optionally implemented in parallel. In the back-projection, one embodiment of the reconstruction device 114 uses a pixel-driven technique to back-project all of the normalized difference projection data in a subset to form the desired updated image volume. Because the reconstruction device 114 back-projects all ray sums, i.e., difference projection data, in a subset to form an image volume, this operation is optionally implemented in parallel too. These operations are applied to every subset N to complete a single OS-SART step. This and other embodiments are optionally included in the current scope of the invention as more particularly claimed in the appended claims.

In the total variation (TV) minimization step, one embodiment of the reconstruction device 114 employs a line search strategy to search a positive step size so as to ensure the objective function of the current image volume to be smaller than that of the previous image volume.

One embodiment of the current invention further includes various software modules and hardware components for substantially reducing axial artifacts in computer tomography images using a predetermined technique. According to one aspect of the current invention, an axial artifact reduction device 117 of the CT apparatus advantageously performs the axial artifact reduction steps on the cone beam data. In one embodiment, the axial artifact reduction device 117 is operationally connected to other software modules and or system components such as the storage device 112, the reconstruction device 114, the display device 116 and the input device 115 via a data/control bus. In this regard, the axial artifact reduction device 117 alone does not necessarily perform axial artifact reduction functions and or their associated tasks in other embodiments according to the current invention. Furthermore, the axial artifact reduction device 117 is optionally a part of other devices such as the reconstruction device 114 in alternative embodiments according to the current invention.

In general, projection data in CT is available after a predetermined log-conversion process. The log-conversion process converts measured X-ray intensity signals that have been attenuated by a scanned object into line integral data. Subsequently, CT images are reconstructed from the line integral data by known methods of mathematical inversion. That is, the axial artifact reduction device 117 has a direct access to the measured X-ray intensity signals.

The axial artifact reduction device 117 expands the insufficient measured data in one embodiment according to the current invention. As described for the prior art problem with respect to FIG. 1, one major cause of the axial artifacts is the insufficient measured data due to the cone beam source in the conventional circular scanning geometry. The image volumes irradiated by x-rays are defined by the rays $p_1$, $P_2$, $p_3$, and $p_4$ as a source S is rotated around a predetermined vertical axis Z. In this regard, shaded regions A are not sufficiently irradiated in the full-scan scheme since not all rays pass through the regions A within the angular range from 0 to $2\pi$. To supplement the insufficient data in the shaded region A, one embodiment of the axial artifact reduction device 117 expands the projection data in z-directions by adding a predetermined number of rows of additional data on top and bottom on the measured data. One embodiment of the axial artifact reduction device 117 generates the additional data by copying data from the measured data in the edge row that corresponds to an edge of the detector. Another embodiment of the axial artifact reduction device 117 generates the additional data by extrapolating data based upon the available measured data near the edge row that corresponds to an edge of the detector. Thus, the embodiment of the axial artifact reduction device 117 generates the expanded data based upon the originally measured data and the additional data.

By the same token, the axial artifact reduction device 117 also performs tasks related to selecting a weighting function and to generating weight values to be used during an iterative reconstruction process in one embodiment according to the current invention. In certain embodiments, the axial artifact reduction device 117 determines a function that validates the expanded data. One exemplary function is based upon an axial position such as the detector row coordinate or the expanded detector row coordinate. One purpose of the exemplary weighting is to reduce weight or validity of the additional data and to keep full weight or validity of the measured data. The weighting function is optionally a combination of predetermined functions such as the above described axial position based weighting and statistical weighting based upon the detected photon count. Furthermore, in other embodiments, the reconstruction device 114 optionally determines a weighting function before or during an iterative reconstruction process.

Either or both of the axial artifact reduction device 117 and the reconstruction device 114 determine weights using a predetermined weight or validation function using the expanded data prior to an iterative reconstruction process. The corresponding weights are generated in advance and stored in one embodiment.

Still referring to FIG. 2, either or both of the axial artifact reduction device 117 and the reconstruction device 114 apply a combination of the predetermined weights to an instance of the image during an iterative reconstruction process. The weights are generated in advance and stored in one embodiment. Alternatively, the weights are generated on the fly in another embodiment. For example, the combination weights are generated using two functions based upon a predetermined noise model and a predetermined window function according to the current invention.

For a predetermined iterative reconstruction technique, either or both of the axial artifact reduction device 117 and the reconstruction device 114 generate a seed image to be initially used in the iteration. One example is analytic filtered-backprojection image volume (FBP seed) with extended Z-range. The details of reconstructing the FBP seed involves the extended Z-range as disclosed in US Patent Application Publication No. 2011/0103662 A1 as published on May 5, 2011. The disclosure of the US Pub No. 2011/0103662 is hereby incorporated by the external reference to be a part of the current application.

Figure 3:
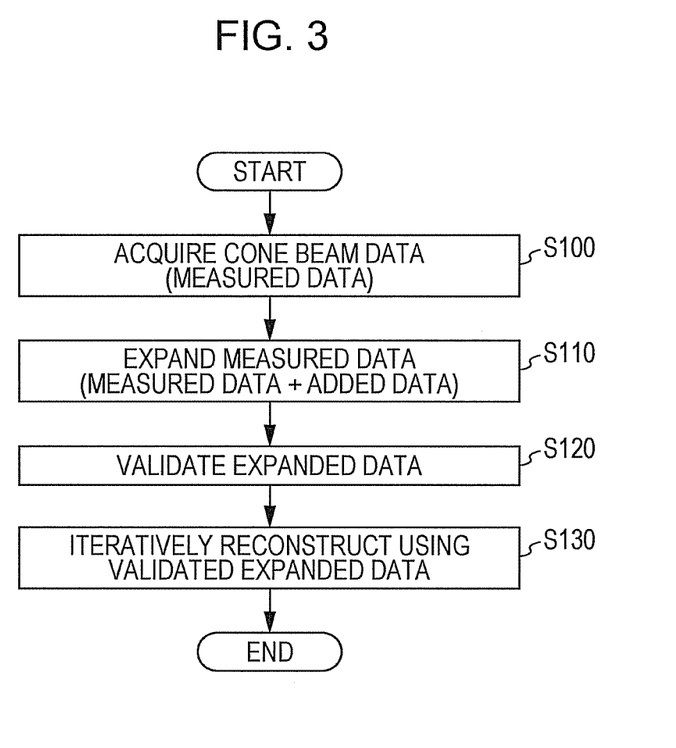
FIG. 3 is a flow chart illustrating general steps involved in the iterative reconstruction process for substantially reducing the axial artifacts in one embodiment according to the current invention.

Now referring to FIG. 3, a flow chart illustrates general steps involved in the iterative reconstruction process for substantially reducing the axial artifacts in one embodiment according to the current invention. In a step S100, measured data has been acquired using the source traveling in a predetermined circular trajectory. The source emits the X rays at a predetermined cone angle. The measured data is now stored as projection data in a storage device in one embodiment.

In a step S110, the measured data is expanded due to its insufficient nature caused by the truncated cone beam during the data acquisition step S100. As described for the prior art problem with respect to FIG. 1, one major cause of the axial artifacts is the insufficiently measured data due to the circular cone beam scanning geometry. To supplement the insufficient data in certain region, the projection data is expanded in z-directions by adding a predetermined number of rows of additional data on top and bottom on the measured data in one embodiment. Thus, the embodiments of the step S110 generate the expanded data based upon the originally measured data and the additional data.

In a step S120, one embodiment performs tasks related to selecting a weighting function and determining a weight value to be used during an iterative process before the reconstruction starts in one embodiment according to the current invention. In certain embodiments, a validity function favors the measured data to the additional data. One exemplary validity function is based upon the axial position of the detectors or the detector row. One purpose of the exemplary weighting is to reduce weight or validity of the additional data that has been added and to keep full weight or validity of the originally measured data. The weighting function is optionally a combination of predetermined functions such as the above described axial position based weighting and statistical weighting based upon the detected photon count. Furthermore, in other embodiments, the reconstruction device 114 optionally determines a window weighting function before or during an iterative reconstruction process.

Lastly, a step S130 iteratively reconstructs an image based the expanded but validated data for substantially reducing axial artifacts according to the current invention. In one embodiment, weights are generated in advance, and the weights are applied to an instance of the image during an iterative reconstruction process. Alternatively, the weights are generated on the fly in another embodiment of the step S130.

Figure 4:
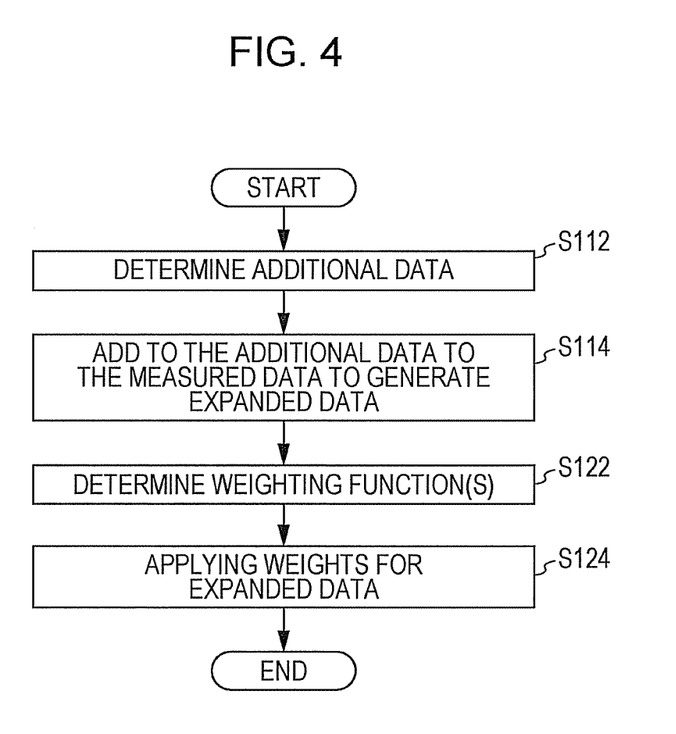
FIG. 4 is a flow chart illustrating some detailed steps involved in generating and validating the expanded data for substantially reducing the axial artifacts in one embodiment according to the current invention.

Now referring to FIG. 4, a flow chart illustrates some detailed steps involved in generating and validating the expanded data for substantially reducing the axial artifacts in one embodiment according to the current invention. The expanded data includes both the originally measured data and the additionally generated data. In a step S112, it is determined how the additional data is generated. That is, the step S112 determines certain rules or criteria for adding the additional data to the measured data. In a step S114, the additional data is generated according to the criteria of the step S112 by copying data from a part of the measured data in the edge row that corresponds to an edge of the detector in one particular implementation. Another implementation generates the additional data by extrapolating data according to the criteria of the step S112 based upon the available measured data near the edge row that corresponds to an edge of the detector in the step S114. Thus, the step S114 generates the expanded data which contains the originally measured data and the newly synthesized data.

Still referring to FIG. 4, a step S122 determines a function that validates the expanded data from the step S114. One exemplary validation function is a predetermined function to generate a weight based upon the detector row in one particular implementation. In further detail, one example validation function such as ComputeAxialWeight( ) is implemented based upon the following parameters:

Nseg: a number of detector rows

SegTaper: controls a slope and one suggested value is Nseg/4)

Seg: detector row coordinate, $0<=seg<Nseg$ segX: expanded detector row coordinate, $0<=seg<NsegX$ ch: detector column coordinate, $0<=ch<Nch$ For example, using the following set of parameter values, Nseg=320, NsegX=400, Nch=896 and SegTaper=80, for each detector row and column coordinates, an axial weight or SegWeight is determined according to the following conditions in one particular implementation.

if (segX<SegTaper), SegWeight[segX, ch]=segX/SegTaper else if (segX<NsegX−SegTaper), SegWeight[segX, ch]=1 else SegWeight[seg, ch]=(Nseg−seg)/SegTaper;

Furthermore, the validation function is optionally a combination of weight functions. For example, a Total Weight function is a product of a predetermined AxialWeight function and a predetermined StatWeight function as illustrated in Equation (1) below:

$$\text{Total Weight}(col,row,view) = \text{AxialWeight}(col,row) * \text{StatWeight}(col,row,view) \quad (1)$$

wherein col, row and view respectively indicate a detector column position, a detector row position and a view position of a given piece of the measured or projection data. The AxialWeight function relies upon the detector position so that weight or validity of the additional data is reduced while weight or validity of the measured data is kept full. Meanwhile, the StatWeight is a statistical function according to a predetermined noise model. For example, the following Equation (2) defines one StatWeight function.

$$\text{StatWeight}(col,row,view) = I*I/(Ve+W*I) \quad (2)$$

where I=RawCount (col, row, view), Ve=electronic noise variance value and W detector variance gain.

Still referring to FIG. 4, a step S124 determines applies weights to an instance of the image during an iterative reconstruction process. The weights are generated in advance and stored prior to the step S122 in one embodiment. Alternatively, the weights are generated on the fly in the step S124 in another embodiment. In either case, a fixed voxel-independent weigh is applied in back-projection during iterations. In one example, the weight is applied using a modified version of OS-SART as indicated in Equation (3) below:

$$x_j^{(n+1)} = x_j^{(n)} + \lambda_n \times \frac{\sum_i a_{i,j}\left(w_i\left(b_i - \sum_k a_{i,k}x_k^{(n)}\right) / \sum_k a_{i,k}\right)}{\sum_i a_{i,j}w_i} \quad (3)$$

where $x_j^{(n+1)}$ and $x_j^{(n)}$ denote values of the $j^{th}$ element of the reconstructed image x in $(n+1)^{st}$ and $n^{th}$ iteration, respectively, the parameter $\lambda_n$ is the relaxation parameter, and the quantity $w_i$ is the weight assigned to each projection datum. A is the system matrix which mimics the x-ray projection process whose entries are denoted by $a_{i,j}$. The iterative reconstruction according to the current invention is not limited to OS-SART and includes other known-iterative techniques such as SART, EM or MAP.

For a predetermined iterative reconstruction technique, a seed image is optionally generated for the iteration according to one embodiment of the current invention. One example is analytic filtered-backprojection image volume (FBP seed) with extended Z-range. The details of reconstructing the FBP seed involves the extended Z-range as disclosed in US Patent Application Publication No. 2011/0103662 A1 as published on May 5, 2011. The disclosure of the US Pub No. 2011/0103662 is hereby incorporated by the external reference to be a part of the current application. Alternatively, zero seed (zero image) is used for the iteration in another embodiment of the current invention.

Figure 5:
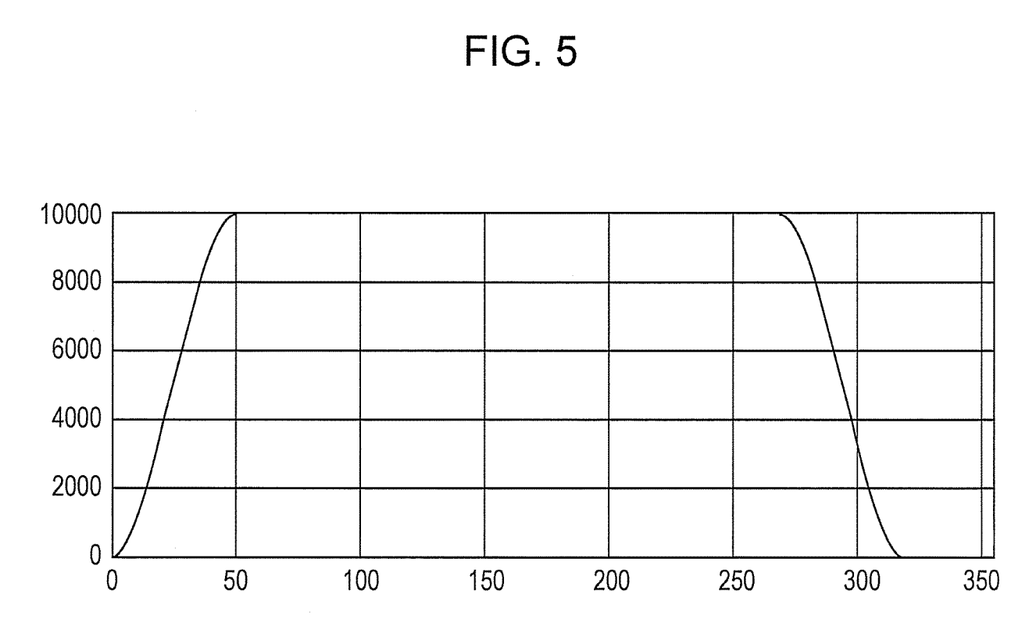
FIG. 5 is a diagram illustrating an exemplary validation function for axial weights as a function of detector rows for substantially reducing the axial artifacts according to the current invention.

FIG. 5 is a diagram illustrating an exemplary validation function for axial weights as a function of detector rows for substantially reducing the axial artifacts according to the current invention. This is a merely illustrative of one validation function, and the current invention is not limited to a particular function.

Figure 6A:
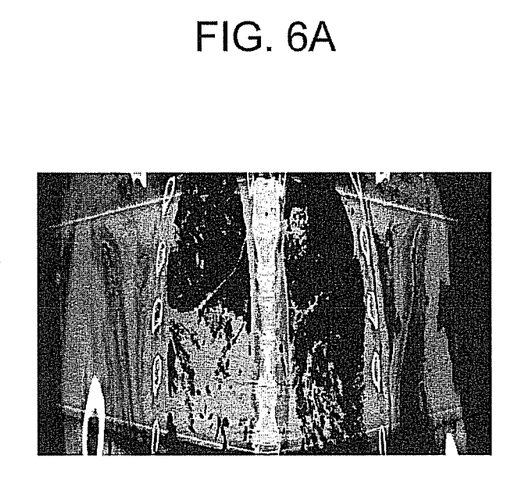
FIG. 6A is an iteratively reconstructed image of chest with substantial axial artifacts as seen on top and bottom of the image volume.

FIG. 6A is an iteratively reconstructed image of chest with substantial axial artifacts as seen on top and bottom of the image volume. The filed of view is 500 mm. Since the image has been iteratively reconstructed without any of the above described validation scheme, the image exhibits the axial artifacts.

Figure 6B:
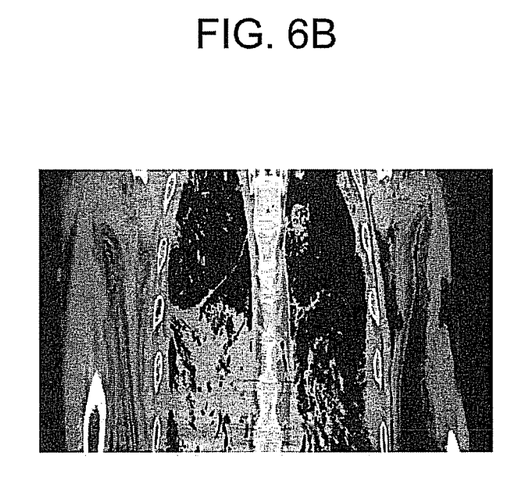
FIG. 6B is an iteratively reconstructed image of chest with substantially reduced axial artifacts according to the current invention.

FIG. 6B is an iteratively reconstructed image of chest with substantially reduced axial artifacts according to the current invention. The filed of view is 500 mm. Since the image has been iteratively reconstructed with one of the above described validation schemes according to the current invention, the image exhibits a substantially reduced amount of the axial artifacts.

Figure 7A:
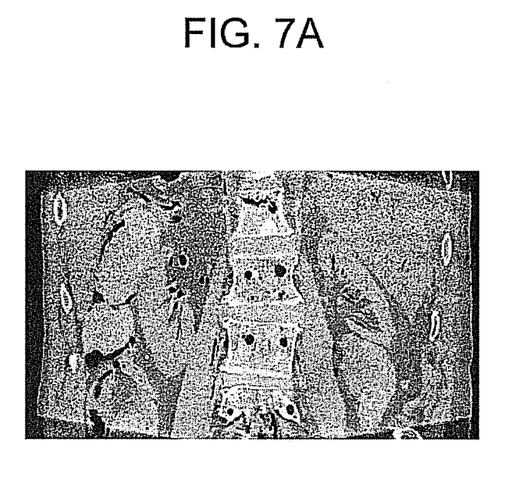
FIG. 7A is an iteratively reconstructed image of abdomen with substantial axial artifacts as seen on top and bottom of the image volume.

FIG. 7A is an iteratively reconstructed image of abdomen with substantial axial artifacts as seen on top and bottom of the image volume. The filed of view is 500 mm. Since the image has been iteratively reconstructed without any of the above described validation scheme, the image exhibits the axial artifacts.

Figure 7B:
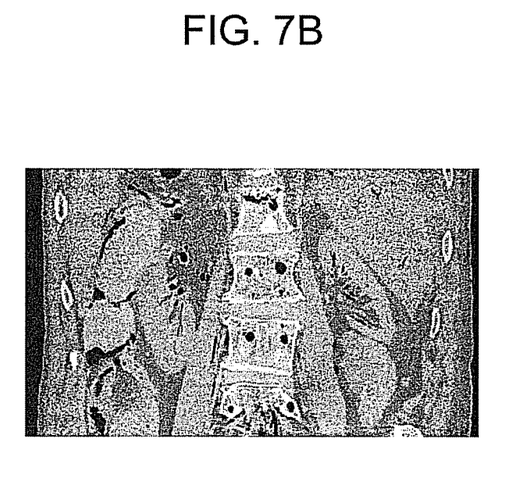
FIG. 7B is an iteratively reconstructed image of abdomen with substantially reduced axial artifacts according to the current invention.

FIG. 7B is an iteratively reconstructed image of abdomen with substantially reduced axial artifacts according to the current invention. The filed of view is 500 mm. Since the image has been iteratively reconstructed with one of the above described validation schemes according to the current invention, the image exhibits a substantially reduced amount of the axial artifacts.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of iterative image reconstruction in computed tomography, comprising the steps of:
    a) expanding measured data by adding additional data along a predetermined axis that is parallel to an axis of rotation according to the measured data to generate expanded data;
    b) generating a validity weight based upon a predetermined function for weighting the expanded data at each of projection bins; and
    c) iteratively reconstructing an image volume with full axial coverage using the expanded data and the validity weight according to a predetermined iterative reconstruction technique.

2. The method of iterative image reconstruction in computed tomography according to claim 1 wherein the additional data is a predetermined number of rows of identical data that corresponds to one of edge rows.

3. The method of iterative image reconstruction in computed tomography according to claim 1 wherein the additional data is extrapolated.

4. The method of iterative image reconstruction in computed tomography according to claim 1 wherein the predetermined function has an axial weight component.

5. The method of iterative image reconstruction in computed tomography according to claim 1 wherein the predetermined function has a combination of an axial weight component and a statistical weight component.

6. The method of iterative image reconstruction in computed tomography according to claim 1 wherein a seed in said step c) is a reconstructed analytic filtered-backprojection image based upon the expanded data.

7. The method of iterative image reconstruction in computed tomography according to claim 1 wherein the measured data is obtained along a circular source trajectory.

8. The method of iterative image reconstruction in computed tomography according to claim 1 wherein the measured data is obtained along a helical source trajectory.

9. The method of iterative image reconstruction in computed tomography according to claim 1 wherein the predetermined iterative reconstruction technique includes algebraic reconstruction technique (ART) type algorithms, simultaneous algebraic reconstruction technique (SART) type algorithms, ordered-subset simultaneous algebraic reconstruction technique (OS-SART) type algorithms, simultaneous iterative reconstruction technique (SIRT) type algorithms, expectation maximization (EM) type algorithms and penalized least square type algorithms (PLS).

10. The method of iterative image reconstruction in computed tomography according to claim 1 wherein the predetermined iterative reconstruction technique is ordered subset simultaneous algebraic reconstruction technique (OS-SART), which is weighted by the validity weight as denoted by $d_i$ for ith measured projection of the measured projection data as:

$$x_j^{(n+1)} = x_j^{(n)} + \lambda_n \left( \frac{\sum_i a_{i,j} \left( \frac{d_i \left( b_i - \sum_k a_{i,k} x_k^{(n)} \right)}{\sum_k a_{i,k}} \right)}{\sum_i a_{i,j} d_i} \right)$$

where $x_j^{(n+1)}$ is an updated image from an old image $x_j^{(n)}$, $\lambda_n$ is a relaxation factor, $a_{i,j}$ is an element of the system matrix, and $b_i$ is after-log data of the expanded data at an ith detector bin.

11. A system for iteratively reconstructing an image in computed tomography, comprising:
an axial artifact reduction device for expanding measured data by adding additional data along a predetermined axis that is parallel to an axis of rotation according to the measured data to generate expanded data, said axial artifact reduction device generating a validity weight based upon a predetermined function for weighting the expanded data at each of projection bins; and
a reconstruction device connected to said axial artifact reduction device for iteratively reconstructing an image volume with full axial coverage using the expanded data and the validity weight according to a predetermined iterative reconstruction technique.

12. The system for iteratively reconstructing an image in computed tomography according to claim 11 wherein the additional data is a predetermined number of rows of identical data that corresponds to one of edge rows.

13. The system for iteratively reconstructing an image in computed tomography according to claim 11 wherein the additional data is extrapolated.

14. The system for iteratively reconstructing an image in computed tomography according to claim 11 wherein the predetermined function has an axial weight component.

15. The system for iteratively reconstructing an image in computed tomography according to claim 11 wherein the predetermined function has a combination of an axial weight component and a statistical weight component.

16. The system for iteratively reconstructing an image in computed tomography according to claim 11 wherein a seed for the predetermined iterative reconstruction technique is a reconstructed analytic filtered-backprojection image based upon the expanded data.

17. The system for iteratively reconstructing an image in computed tomography according to claim 11 wherein the measured data is obtained along a circular source trajectory.

18. The system for iteratively reconstructing an image in computed tomography according to claim 11 wherein the measured data is obtained along a helical source trajectory.

19. The system for iteratively reconstructing an image in computed tomography according to claim 11 wherein the predetermined iterative reconstruction technique includes algebraic reconstruction technique (ART) type algorithms, simultaneous algebraic reconstruction technique (SART) type algorithms, ordered-subset simultaneous algebraic reconstruction technique (OS-SART) type algorithms, simultaneous iterative reconstruction technique (SIRT) type algorithms, expectation maximization (EM) type algorithms and penalized least square type algorithms (PLS).

20. The system for iteratively reconstructing an image in computed tomography according to claim 11 wherein the predetermined iterative reconstruction technique is ordered subset simultaneous algebraic reconstruction technique (OS-SART), which is weighted by the validity weight as denoted by $d_i$ for ith measured projection of the measured projection data as:

$$x_j^{(n+1)} = x_j^{(n)} + \lambda_n \left( \frac{\sum_i a_{i,j} \left( \frac{d_i \left( b_i - \sum_k a_{i,k} x_k^{(n)} \right)}{\sum_k a_{i,k}} \right)}{\sum_i a_{i,j} d_i} \right)$$

where $x_j^{(n+1)}$ is an updated image from an old image $x_j^{(n)}$, $\lambda_n$ is a relaxation factor, $a_{i,j}$ is an element of the system matrix, and $b_i$ is after-log data of the expanded data at an ith detector bin.

* * * * *